United States Patent
Cramer et al.

(10) Patent No.: US 9,949,014 B2
(45) Date of Patent: Apr. 17, 2018

(54) WIRELESS PAIR OF EARBUDS

(71) Applicant: Peag, LLC, Carlsbad, CA (US)

(72) Inventors: Winthrop Cramer, Carlsbad, CA (US); Reed Patrick Crawford, San Diego, CA (US)

(73) Assignee: Peag, LLC, Carlsbad, CA (US)

( * ) Notice: Subject to any disclaimer, the term of this patent is extended or adjusted under 35 U.S.C. 154(b) by 0 days.

(21) Appl. No.: 15/452,591

(22) Filed: Mar. 7, 2017

(65) Prior Publication Data
US 2017/0359644 A1    Dec. 14, 2017

Related U.S. Application Data

(60) Provisional application No. 62/349,558, filed on Jun. 13, 2016.

(51) Int. Cl.
| H04R 1/10 | (2006.01) |
| H04R 3/12 | (2006.01) |
| G06F 3/16 | (2006.01) |

(52) U.S. Cl.
CPC ........ *H04R 1/1041* (2013.01); *G06F 3/165* (2013.01); *H04R 1/105* (2013.01); *H04R 1/1008* (2013.01); *H04R 3/12* (2013.01); *H04R 2201/107* (2013.01); *H04R 2420/07* (2013.01); *H04R 2430/01* (2013.01)

(58) Field of Classification Search
None
See application file for complete search history.

(56) References Cited

U.S. PATENT DOCUMENTS

| 6,449,374 B1* | 9/2002 | Skulley | H04R 1/083 |
| | | | 381/330 |
| 6,728,388 B1* | 4/2004 | Nageno | H04R 1/105 |
| | | | 381/330 |
| D575,772 S * | 8/2008 | Schultz | D14/206 |
| D585,881 S * | 2/2009 | Nam | D14/205 |
| 2002/0016188 A1* | 2/2002 | Kashiwamura | H04M 1/6033 |
| | | | 455/575.2 |
| 2008/0119138 A1* | 5/2008 | Kim | H04M 1/05 |
| | | | 455/41.2 |
| 2011/0022121 A1* | 1/2011 | Meskins | A61N 1/37229 |
| | | | 607/57 |
| 2012/0140976 A1* | 6/2012 | Birger | H04M 1/05 |
| | | | 381/381 |
| 2012/0224731 A1 | 9/2012 | Lellner | |
| 2012/0230510 A1* | 9/2012 | Dinescu | H04R 5/033 |
| | | | 381/80 |
| 2012/0230532 A1* | 9/2012 | Howell | H04R 1/1066 |
| | | | 381/381 |
| 2014/0073256 A1 | 3/2014 | Newham et al. | |
| 2014/0219467 A1 | 8/2014 | Kurtz | |
| 2014/0376735 A1 | 12/2014 | Asrani et al. | |
| 2016/0014492 A1* | 1/2016 | McCarthy | H04R 1/1016 |
| | | | 381/74 |
| 2016/0072558 A1 | 3/2016 | Hirsch et al. | |

* cited by examiner

*Primary Examiner* — Paul Huber
(74) *Attorney, Agent, or Firm* — LambentIP

(57) ABSTRACT

A wireless pair of earbuds is provided, wherein each earbud comprises an earbud body including a tip configured to be inserted in an ear canal of a user, the earbud body housing electronic circuitry including a controller for controlling components in the earbud, and an ear hook coupled with the earbud body and configured to fit around a root of an ear pinna of the user, the ear hook housing an antenna.

18 Claims, 6 Drawing Sheets

«WIRELESS PAIR OF EARBUDS»

This application claims the benefit of U.S. provisional application Ser. No. 62/349,558, filed on Jun. 13, 2016.

BACKGROUND

With the popularity of wearables, high-quality wireless communication among a group of devices is becoming increasingly important. Modern wireless technologies include LTE, Wi-Fi, and Bluetooth, to name a few, the developments of which have been driven by needs to eliminate cluttering physical connections and wirings. Earbuds, earphones or headphones allow users to enjoy hand-free audio listening, and may be wirelessly connected to the main device based on the Bluetooth standard, for example. A device based on the Bluetooth standard operates for exchanging data over short distances, at frequencies between 2402 and 2480 MHz, or 2400 and 2483.5 MHz including guard bands 2 MHz wide at the bottom end and 3.5 MHz wide at the top end. This band is commonly called: Industrial, Scientific and Medical (ISM) 2.4 GHz short-range radio frequency (RF) band.

In conventional earbuds or earphones, however, high audio quality including stereo effects can be typically achieved by linking the pair by a wired connection having a common controlling box. Such physical wirings are necessitated by the fact that when devices are embedded in skin, the wireless communication signal can fall off along the pathway, making the signal transmission and reception extremely difficult. Skin has both electric and magnetic properties, and it matters if the skin is wet or dry. As a rule of thumb, through 5 mm of skin, a Bluetooth signal will lose 3 decibels (dB) on average. That compares to the loss of 6 dB for a Bluetooth signal going through a standard concrete wall.

In many cases, to keep costs down, wearable devices need to be designed with low-cost off-the shelf antennas without the functional flexibility or efficiency typically provided by a custom antenna that takes advantage of the material and design of the wearable devices. It is estimated that use of custom antennas potentially raises the materials cost in a wearable by 10%-15%, for typical cases. Today, a small off-the-shelf antenna based on copper or ceramic could cost from 30 cents to 60 cents, or even lower, when purchased in bulk.

Thus, it is in users' best interest to have a pair of earbuds or earphones with high-quality and reliable communication based on low-cost antennas and components, and most importantly, without relying on connecting wirings.

DETAILED DESCRIPTION

In view of the high public demand for wireless, wearable earbuds or earphones, this document describes a new type of wireless earbuds, which provide ergonomic stability and high audio quality without physical wirings. Details of the present wireless pair of earbuds are explained below with reference to accompanying drawings.

Figure 1:
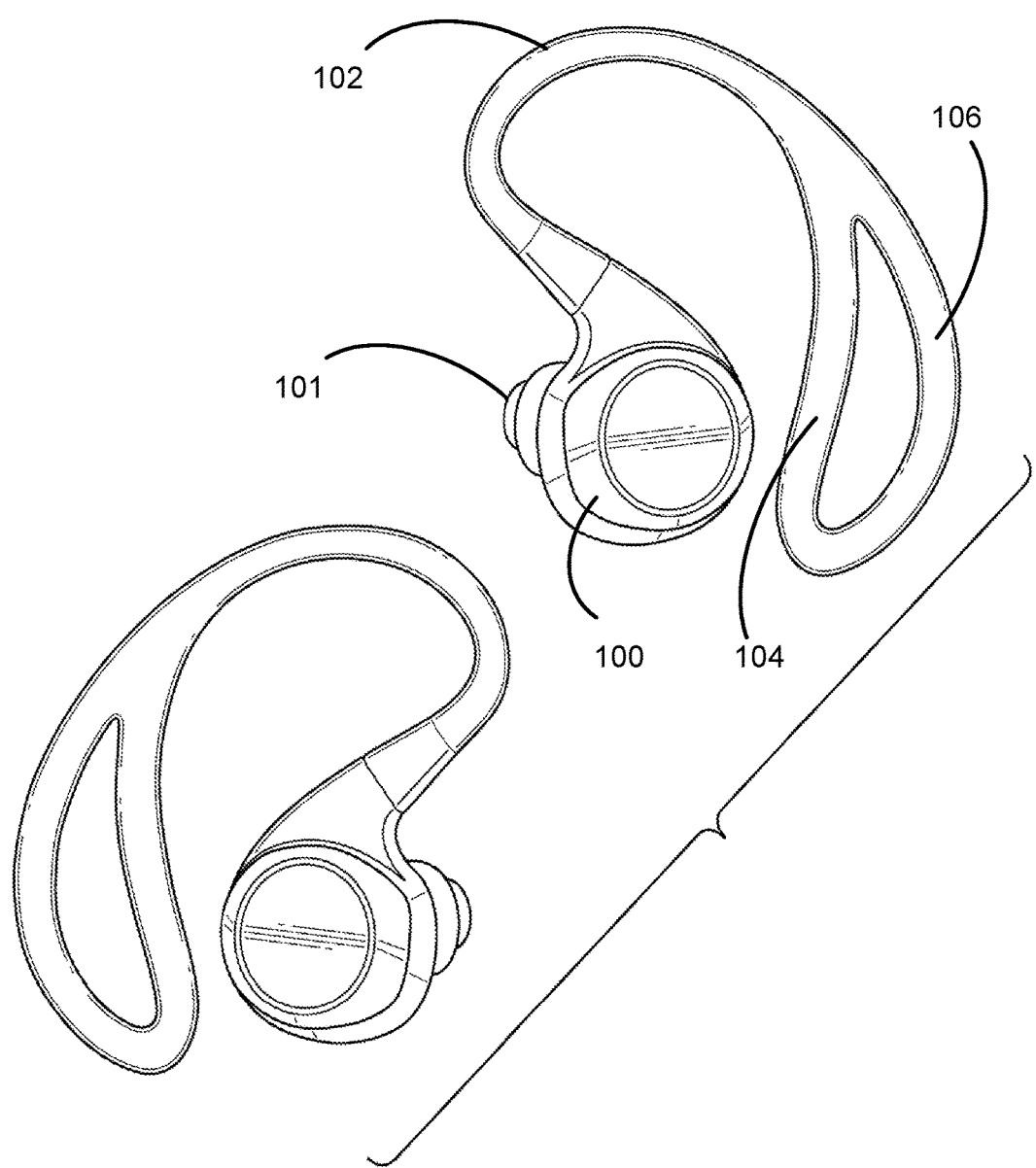
FIG. 1 illustrates an example of a wireless pair of earbuds, according to an embodiment.

FIG. 1 illustrates an example of the wireless pair of earbuds, according to an embodiment, which is configured to be worn by a user to receive and transmit audio signals. The audio signals, in the form of music, spoken language, etc. can be received by the earbuds from an external device such as a smartphone, MP3 player, iPod™, a radio and other mobile devices. For example, hand-free conversations may be enabled by transmitting the user's voice received by the earbuds to a smartphone, and receiving the other person's voice transmitted from the smartphone to the earbuds. In another example, a hand-free audio listening may be enabled by receiving the music transmitted from a smartphone to the earbuds. Each of the earbuds includes an earbud body 100 and an ear hook 102 coupled to the earbud body 100. The right and left earbuds are configured to be symmetric; thus, the details of only one of the pair are mainly described in the following.

The earbud body 100 serves as a housing to accommodate the electrical and mechanical components and parts necessary for signal transmission, reception and other functions. One end portion of the earbud body 100 is configured to include a tip 101 that can be inserted and fit in an ear canal of a user. The ear hook 102 is formed to extend from the earbud body 100, and the distal end portion of the ear hook 102 includes two branches, a first branch 104 and a second branch 106, in this example. It should be noted that in this document the term "end portion" is used to indicate a portion of an item including not only the end/edge but also its proximity. In the example configuration illustrated in FIG. 1, these two branches 104 and 106 meet to connect to each other at the end, forming a loop made of the connected two branches 104 and 106. Other forms, instead of a loop, are possible. For example, the two branches may be kept separate without being connected at the end, or the two branches may be contiguously attached to each other, forming a wide plate-like or a fin-like shape at the distal end portion of the ear hook 102. As explained later in detail, the second branch 106, which can be adjusted to be an outer branch with respect to the first branch 104, is configured to house an antenna therein. The first branch 104, which can be adjusted to be an inner branch with respect to the second branch 106 and closer to the user's head when worn, can be adjusted to fit around the root of an ear pinna of the user to stably position the earbud.

Figure 2A:
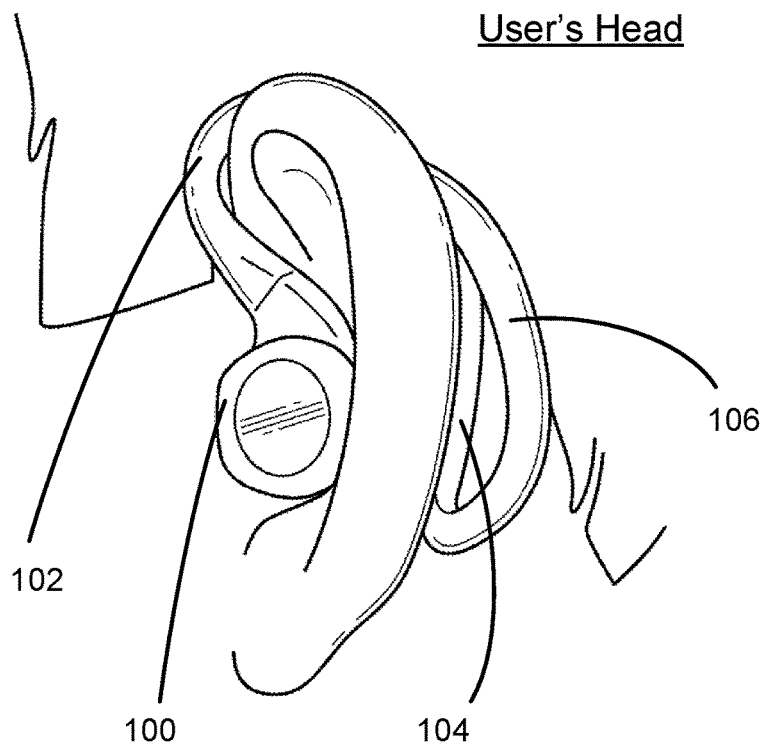
FIG. 2A illustrates one of the wireless pair of earbuds worn by a user, showing a view in the direction from the left side of the user's head.
Figure 2B:
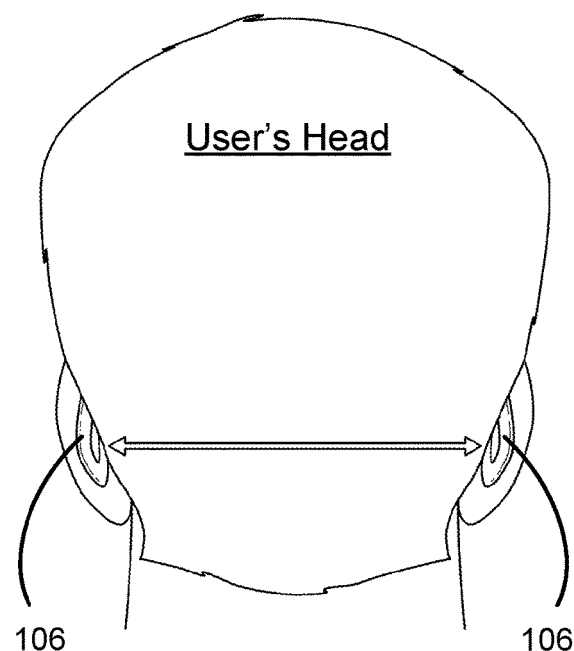
FIG. 2B illustrates the wireless pair of earbuds worn by a user, showing a view in the direction from the rear side of the user's head.

FIGS. 2A and 2B illustrate the wireless pair of earbuds worn by a user, showing a view in the direction from the left side of the user's head and a view in the direction from the rear side of the user's head, respectively. In FIG. 2A, the user wears the earbud on the left ear, wherein the part of the earbud body 100 shows up just outside the ear canal, the first branch 104 of the ear hook 102 is adjusted to fit around the root of the user's ear pinna, and the second branch 106 is positioned outwardly away from the user's head. In FIG. 2B, the second branches 106 of the respective ear hooks of the right and left earbuds are positioned away from the lower head just above the neck, and slightly protruding from the back of the ears, so that the imaginary horizontal line connecting the right and left second branches 106 by going around the user's head is substantially straight, or slightly curved but less curved than the imaginary horizontal line connecting the right and left first branches 104.

Figure 3A:
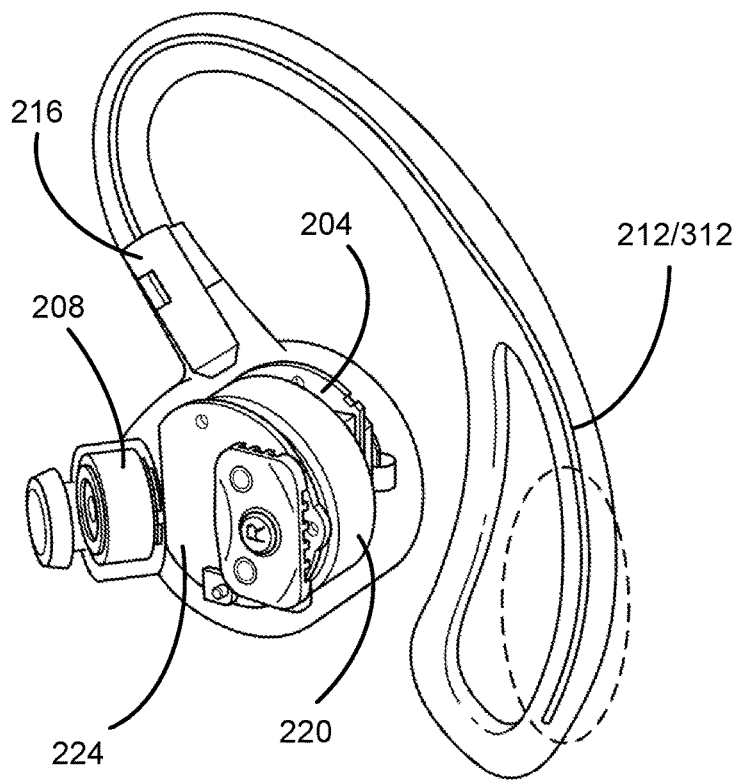
FIG. 3A illustrates an example configuration of the internal parts of the wireless pair of earbuds, according to an embodiment, showing a view of the right earbud in the direction from the user's head.
Figure 3B:
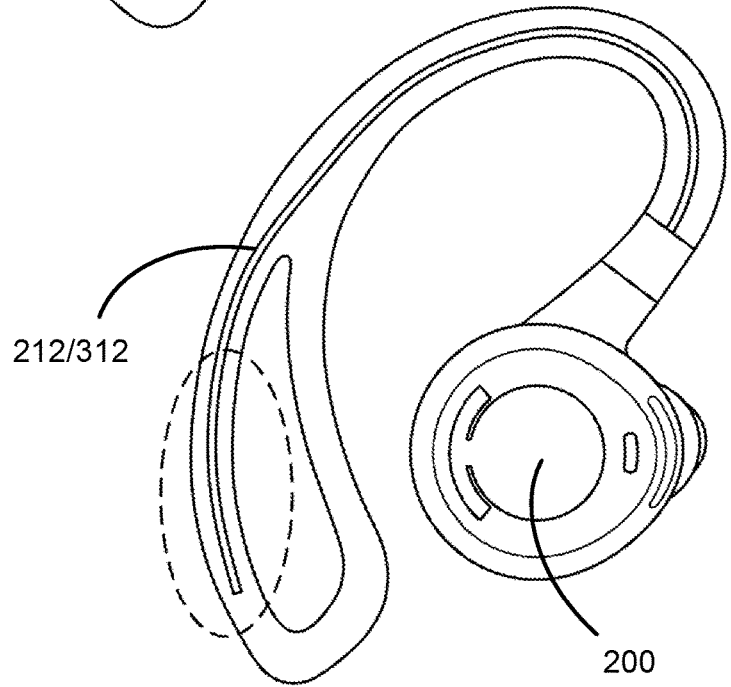
FIG. 3B illustrates an example configuration of the internal parts of the wireless pair of earbuds, according to an embodiment, showing a view of the left earbud in the direction from the left side of the user's head.
Figure 4:
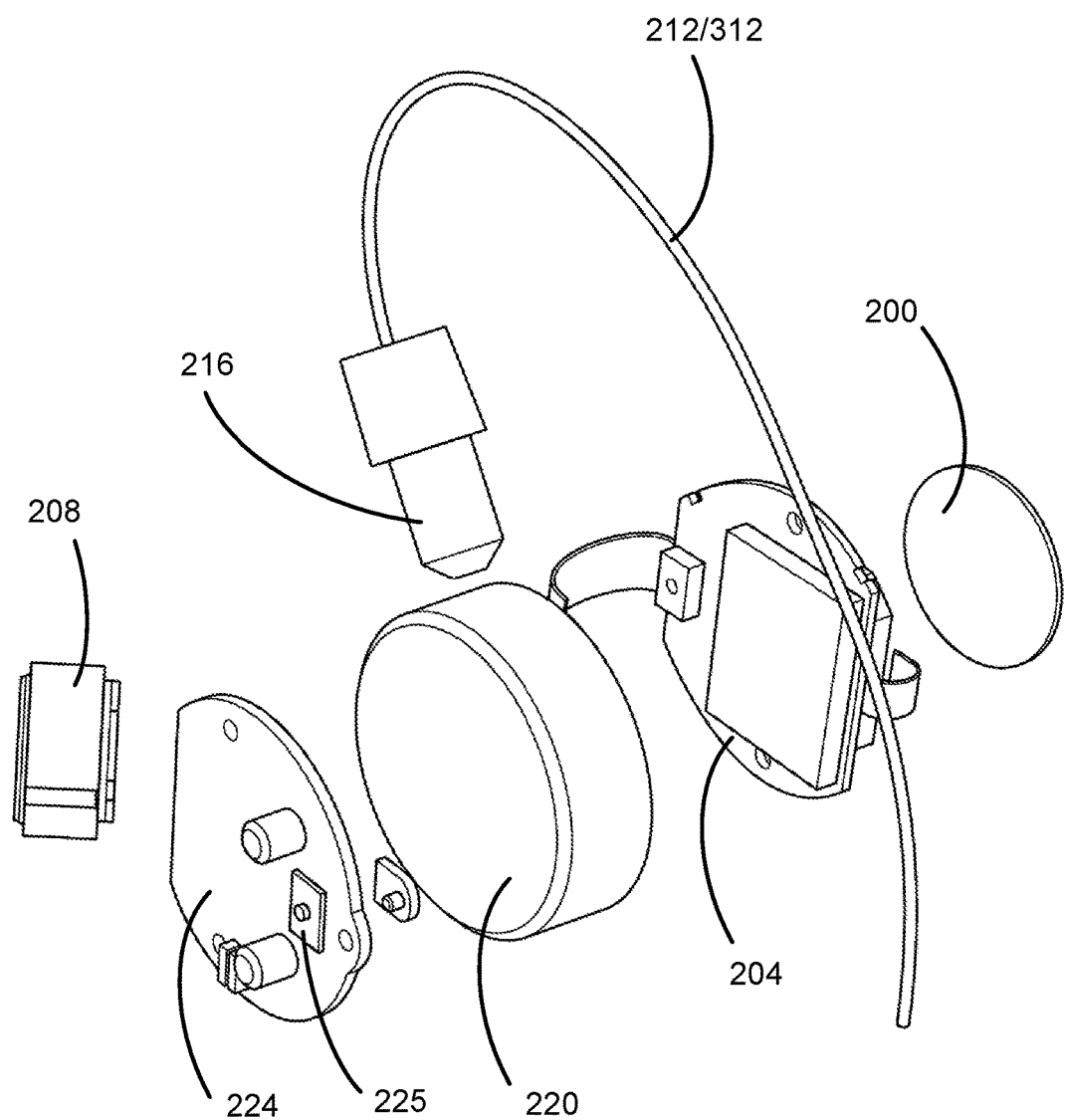
FIG. 4 is an exploded view illustrating an example set of the internal parts of one of the earbuds, in the order corresponding to the right earbud as illustrated in FIG. 3A.

FIGS. 3A and 3B illustrate an example configuration of the internal parts of the wireless pair of earbuds, according to an embodiment, wherein a view of the right earbud in the direction from the user's head is illustrated in FIG. 3A, and a view of the left earbud in the direction from the left side of the user's head is illustrated in FIG. 3B. FIG. 4 is an exploded view illustrating an example set of the internal parts of one of the earbuds, in the order corresponding to the right earbud as illustrated in FIG. 3A. Details of the functions and operations of the electronic components including modules and mechanical parts inside the wireless pair of earbuds are explained below with reference to FIGS. 3A, 3B and 4.

A touch sensor button 200 is included in each earbud at the other end portion than the portion where the tip 101 is formed in this example. A touch sensor 201 (not shown in FIGS. 3A, 3B and 4) is coupled to the touch sensor button 200 and may be included in the electronic circuitry on a printed circuit board (PCB) 204. The electronic circuitry on the PCB 204 may include a controller 205 (not shown in FIGS. 3A, 3B and 4) including firmware for controlling various components in the earbud, such as electronic parts and modules. The electronic circuitry on the PCB 204 may further include one or more transceivers associated with the controller 205 for controlling signal transmission and reception of one or more antennas, respectively. Each transceiver may include at least one receiver for controlling the associated antenna to receive signals and at least one transmitter for controlling the associated antenna to transmit out signals, and may include RF components and modules to perform at least one of analog-to-digital conversion, digital-to-analog conversion, low noise amplification, power amplification, digital signal processing, modulation, demodulation, and other RF processing functions. Each earbud of the present wireless pair of earbuds may further include a battery 220 for powering up the electronic components including modules. In the example configuration illustrated in FIGS. 3A, 3B and 4, the battery 220 is sandwiched by the PCB 204 and an auxiliary PCB 224. The auxiliary PCB 224 may include mechanical parts such as a power button 225, charging pins, and peripheral circuitry for enabling at least one of the hard ON/OFF operation, play or pause mode selection, track forward or backward selection, volume up and down operation, and other mode selections and operations. A user can power up to start the operation by pushing the power button 225 in each earbud. The user can then touch the touch sensor button 200 in one of the earbuds. Upon sensing the touch, the touch sensor 201 activates the controller 205 of the touched earbud to perform various functions as a master with the other earbud of the pair as a slave.

In one embodiment, two antennas may be included in each earbud. For example, a first antenna 211 (not shown in FIGS. 3A, 3B and 4) may be coupled to the PCB 204, and a second antenna 212 may be housed within the ear hook 102. A first transceiver 221 (not shown in FIGS. 3A, 3B and 4) for controlling the first antenna 211 for signal transmission and reception may be included in the electronic circuitry on the PCB 204 and associated with the controller 205. The controller 205 may be configured to control the first transceiver 221 to activate the first antenna 211 to wirelessly communicate with an external device such as a smartphone, MP3 player, iPod, a radio and other mobile devices. The first antenna 211 may be a small-size antenna that can be printed on the PCB 204 or can be a packaged discrete component coupled to the PCB 204. The first transceiver 221 and the first antenna 211 may be configured to comply with the Bluetooth standard, for example, for the short-range wireless communication. The audio signals received by the first antenna 211 coupled to the first transceiver 221 are sent to a driver 208, which generates corresponding vibrations, i.e., sound, for the user to listen to.

The second antenna 212 may have a shape of a bent wire along and within the ear hook 102, and may be made of a conductive material for electromagnetic radiation. In this example, the second branch 106 of the ear hook 102 is configured to house at least the distal end portion of the second antenna 212 therein. Accordingly, the second antenna 212 is accommodated along and within the outer portion of the ear hook 212. An example of the second antenna 212 may be a bent whip antenna, which is a type of monopole antenna. As is known to those skilled in the art, in a whip antenna or a monopole antenna, the electromagnetic radiation is the strongest at the distal end portion, as indicated by dashed lines in FIGS. 3A and 3B, which can serve as a radiator of the antenna. The length of a conventional whip antenna is determined by the wavelength of the RF signal used. The most common length is approximately one-quarter of the wavelength. However, with the use of a bent whip antenna such as the second antenna 212, the electromagnetic field may be modified due to the bending compared to a conventional whip antenna of the similar size; that is, the bandwidth, the sensitively, the signal-to-noise ratio and other RF performance parameters may be adjusted by the degree of bending, i.e., the shape and dimensions of the second antenna 212. Examples of other types of antennas that may be used for the second antenna 212 include: dipole antenna, patch antenna, loop antenna, metamaterial antenna, slot antenna, spiral antenna, inverted-F antenna, etc. The shape and dimensions of any employed antenna should be configured to fit within the ear hook 102 and to have the strong radiation at the distant end portion as indicated by dashed lines in FIGS. 3A and 3B. The second antenna 212 can be copper-based, ceramic-based or of any other suitable material.

The bottom end (i.e., the proximal end) of the second antenna 212 is coupled to a root section 216, which may house electrical wiring coupling the second antenna 212 to the electronic circuitry on the PCB 204. A second transceiver 222 (not shown in FIGS. 3A, 3B and 4) for controlling the second antenna 212 for signal transmission and reception may be housed in the root section 216 and electrically coupled to the electronic circuitry on the PCB 204. Alternatively, the second transceiver 222 may be included in the electronic circuitry on the PCB 204. Yet alternatively, the second transceiver 222 may be partially housed in the root section 216 and partially included in the electronic circuitry on the PCB 204. The second antenna 212 and the second transceiver 222 in one earbud and those in the other earbud of the pair may be configured to wirelessly communicate with each other, based on the Bluetooth standard or other standard suitable for short-range communication.

In another embodiment, only one antenna may be included in each earbud. For example, an antenna 312, in place of the second antenna 212, housed in the ear hook 102 in FIGS. 3A, 3B and 4, may be configured to perform wireless communication not only between the earbud and an external device such as a smartphone, but also between the right and left earbuds. With this configuration, there is no need for another antenna such as the first antenna 211 coupled to the PCB 204. Therefore, each earbud includes only one antenna 312, which is in the ear hook 102. In this example, the second branch 106 of the ear hook 102 is configured to house at least the distal end portion of the antenna 312 therein. Accordingly, the antenna 312 is accommodated along and within the outer portion of the ear hook 212. The antenna 312 may have a shape of a bent wire along and within the ear hook 102. An example of the antenna 312 may be a bent whip antenna, which is a type of monopole antenna. As is known to those skilled in the art, in a whip antenna or a monopole antenna, the electromagnetic radiation is the strongest at the distal end portion, as indicated by dashed lines in FIGS. 3A and 3B, which can serve as a radiator of the antenna. The length of a conventional whip antenna is determined by the wavelength of the RF signal used. The most common length is approximately one-quarter of the wavelength. However, with the use of a bent whip antenna such as the antenna 312, the electromagnetic field may be modified due to the bending compared to a conventional whip antenna of the similar size; that is, the bandwidth, the sensitively, the signal-to-noise ratio and other RF performance parameters may be adjusted by the degree of bending, i.e., the shape and dimensions of the antenna 312. Examples of other types of antennas that may be used for the antenna 312 include: dipole antenna, patch antenna, loop antenna, metamaterial antenna, slot antenna, spiral antenna, inverted-F antenna, etc. The shape and dimensions of any employed antenna should be configured to fit within the ear hook 102 and to have the strong radiation at the distant end portion as indicated by dashed lines in FIGS. 3A and 3B. The antenna 312 can be copper-based, ceramic-based or of any other suitable material.

The bottom end (i.e., the proximal end) of the antenna 312 is coupled to a root section 216, which may house electrical wiring coupling the antenna 312 to the electronic circuitry on the PCB 204. A transceiver 322 (not shown in FIGS. 3A, 3B and 4) for controlling the antenna 312 for signal transmission and reception may be housed in the root section 216 and electrically coupled to the electronic circuitry on the PCB 204. Alternatively, the transceiver 322 may be included in the electronic circuitry on the PCB 204. Yet alternatively, the transceiver 322 may be partially housed in the root section 216 and partially included in the electronic circuitry on the PCB 204. The antenna 312 and the transceiver 322 in one earbud and those in the other earbud of the pair may be configured to wirelessly communicate with each other, based on the Bluetooth standard, for example, in addition to wirelessly communicate with an external device such as a smartphone, MP3 player, iPod, a radio and other mobile devices, based on the Bluetooth standard, for example.

The ear hook 102, including the first and second branches 104 and 106, may be made of a flexible material that has minimal interference effects on the electromagnetic propagation therethrough. Examples of such materials include a plastic, polymer, silicone, rubber, and the like or a combination thereof, such as thermoplastic elastomer (TPE). The flexible material used to form the ear hook 102 enables a user to adjust the first branch 104 to fit comfortably around the root of his/her ear pinna, and at the same time, adjust the second branch 106 to position away from the lower head just above the neck, and to slightly protrude from the back of the ears, so that the imaginary horizontal line connecting the right and left second branches 106 by going around the user's head is substantially straight, or slightly curved but less curved than the imaginary horizontal line connecting the right and left first branches 104.

Each earbud of the present wireless pair of earbuds may further include a microphone 230 (not shown in FIGS. 3A, 3B and 4), which may be coupled to the PCB 204, for detecting the voice of a user. The antenna in the master earbud can be configured to transmit the voice signal to an external device, e.g., a smartphone, based on the Bluetooth standard, for example. Thus, the user can have a phone conversation through the microphone in the earbud, without having to hold the smartphone in the proximity of his/her mouth, thereby being able to experience truly hand-free audio listening and phone conversations.

As described according to the above embodiments, the present earbud is configured to include the earbud body 100 and the ear hook 102 coupled to the earbud body 100. The earbud body 100 is configured to include the tip 101 and to house various electronic and mechanical components such as the PCB 204 and the components coupled thereto, the touch sensor button 200, the driver 208, the battery 220, the PCB 224 and the components coupled thereto, the microphone 230, and the root section 216 for the antenna 212/312. The ear hook 102 is configured to house the antenna 212/312 therein.

Figure 5:
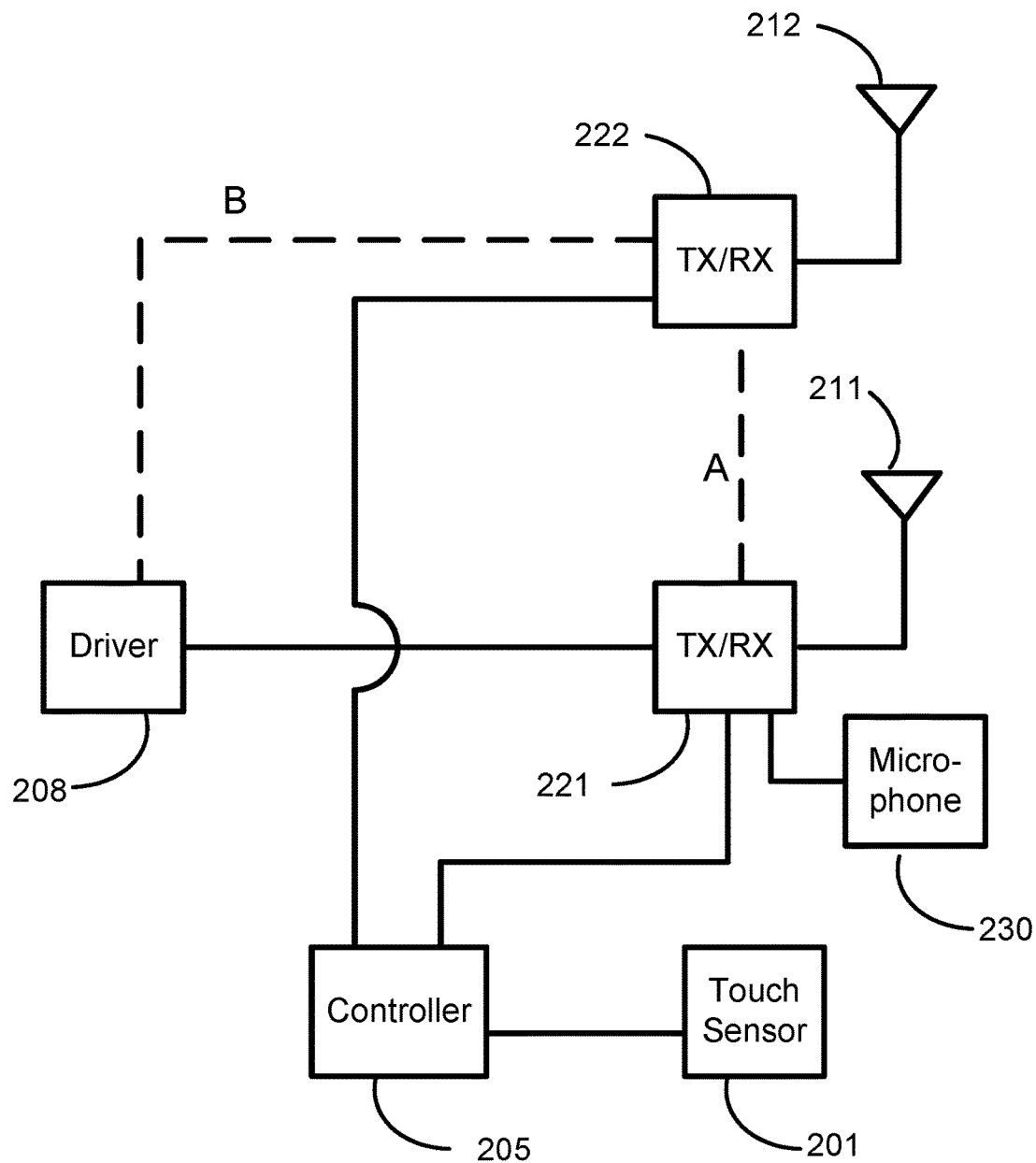
FIG. 5 is a block diagram illustrating an example of the signal transmission path associated with the operation of the present wireless pair of earbuds, according to one embodiment wherein each earbud has two antennas.

FIG. 5 is a block diagram illustrating an example of the signal transmission path associated with the operation of the present wireless pair of earbuds, according to one embodiment wherein each earbud has two antennas. A transceiver is labeled as "TX/RX" in the figure. The first antenna 211 may be coupled to the PCB 204, and the second antenna 212 may be housed in the ear hook 102. The mechanical and electrical configurations are symmetric between the right and left earbuds. A user can power up to start the operation by pushing the power button 225 in each earbud. The user can then touch the touch sensor button 200 coupled to the touch sensor 201 in one of the earbuds. Upon sensing the touch, the touch sensor 201 activates the controller 205 of the touched earbud to perform various functions as a master with the other earbud of the pair as a slave, whereby a master-slave configuration may be formed. The electronic circuitry on the PCB 204 may include the controller 205 including firmware for controlling various electronic components including modules in the earbud. The controller 205 in the electronic circuitry on the PCB 204 of the touched earbud, i.e., the master earbud, controls the first transceiver 221 to activate the first antenna 211 to wirelessly communicate with an external device such as a smartphone, MP3 player, iPod, a radio and other mobile devices, based on the Bluetooth standard, for example. The audio signal received from the external device by the first antenna 211 coupled with the first transceiver 221 is then sent to the driver 208, which generates corresponding vibrations, i.e., sound, for the user to listen to.

Additionally, the controller 205 controls the second transceiver 222 to activate the second antenna 212 of the master earbud to wirelessly communicate with the same and symmetrically configured second antenna 212 of the other earbud, i.e., the slave earbud, by sending a trigger signal.

Upon receiving the trigger signal, in the slave earbud, the controller 205 is triggered to control the first transceiver 221 in the slave earbud to activate the first antenna 211 in the slave earbud to wirelessly communicate with the same external device to receive the audio signals. The audio signal is then sent to the driver 208 of the slave earbud. Thus, both the earbuds receive the audio signals from the same external audio source, providing the user with a high-quality audio experience with the stereo effect.

An alternative signal transmission path is indicated by dashed lines in FIG. 5. As in the previous scenario, a user can power up to start the operation by pushing the power button 225 in each earbud. The user can then touch the touch sensor button 200 coupled to the touch sensor 201 in one of the earbuds. Upon sensing the touch, the touch sensor 201 activates the controller 205 of the touched earbud to perform various functions as a master with the other earbud of the pair as a slave, whereby a master-slave configuration is formed. The controller 205 of the touched earbud, i.e., the master earbud, then controls the first transceiver 221 to activate the first antenna 211 to wirelessly communicate with an external device such as a smartphone, MP3 player, iPod, a radio and other mobile devices. The audio signal from the external device received by the first antenna 211 coupled with the first transceiver 221 is then sent to the driver 208, which generates corresponding vibrations, i.e., sound, for the user to listen to. Additionally, as indicated by the dashed line A in FIG. 5, the audio signal received from the external device by the first antenna 211 coupled with the first transceiver 221 can also be sent to the second transceiver 222 in the master earbud, and then transmitted out from the second antenna 212 of the master earbud to the same and symmetrically configured second antenna 212 of the slave earbud. As indicated by the dashed line B in FIG. 5, the audio signal received from the master earbud by the second antenna 212 of the slave earbud is then sent to the driver 208 by the second transceiver 222 of the slave earbud. Thus, both the earbuds receive the audio signals from the same external audio source, providing the user with a high-quality audio experience with the stereo effect.

As shown in FIG. 5, the user's voice can be detected by the microphone 230, which may be coupled to the PCB 204. The controller 205 controls the first transceiver 221 to process the voice signal and control the first antenna 211 to transmit out the voice signal to an external device, such as a smartphone, based on the Bluetooth standard. The first antenna 211 coupled with the first transceiver 221 in the master earbud may be used to send the voice signal to a smartphone, for example, enabling the user to have a phone conversation through the microphone 230 in the master earbud, without having to hold the smartphone in the proximity of his/her mouth.

Figure 6:
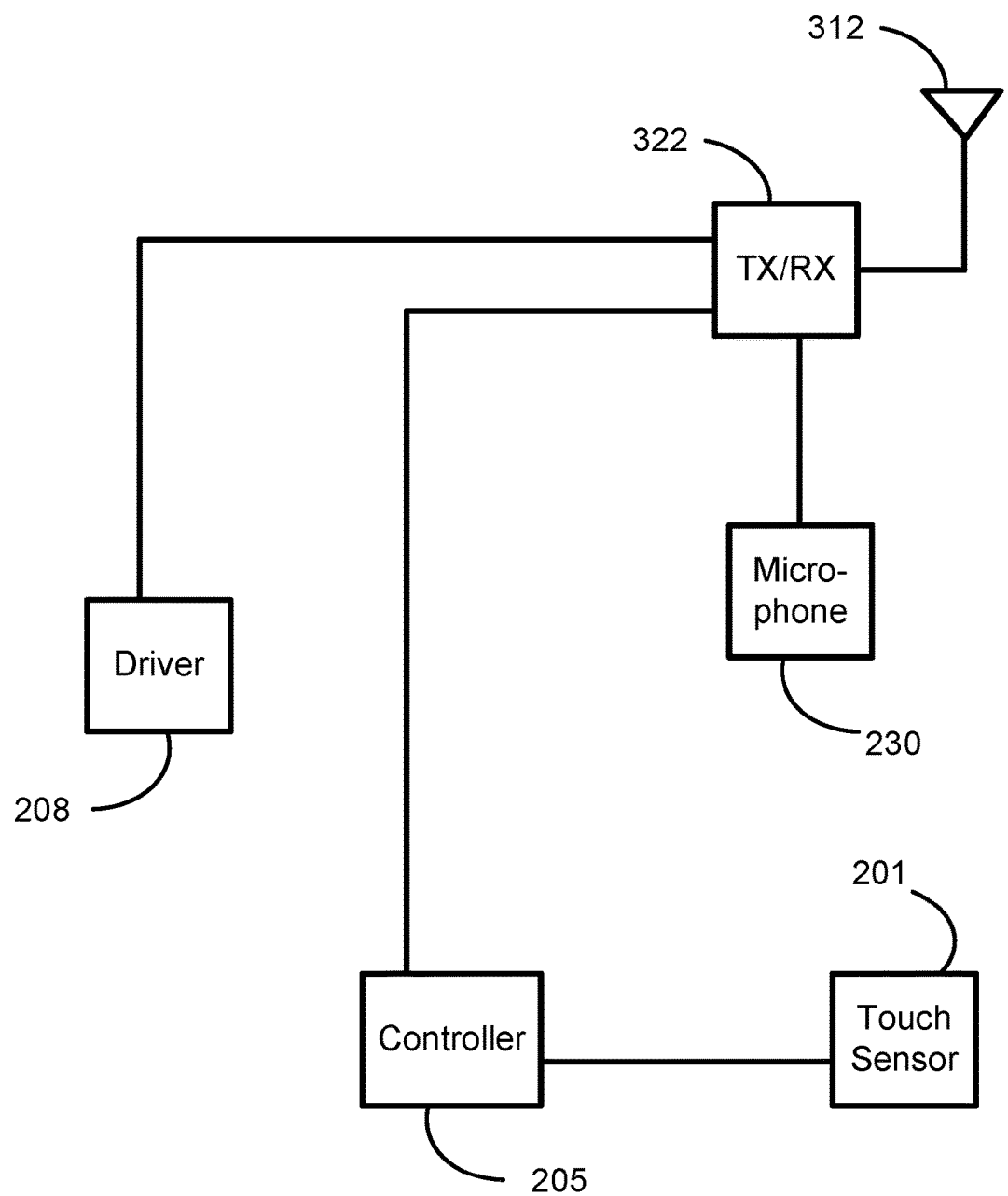
FIG. 6 is a block diagram illustrating an example of the signal transmission path associated with the operation of the present wireless pair of earbuds, according to another embodiment wherein each earbud has one antenna.

FIG. 6 is a block diagram illustrating an example of the signal transmission path associated with the operation of the present wireless pair of earbuds, according to another embodiment wherein each earbud has one antenna. A transceiver is labeled as "TX/RX" in the figure. The antenna 312 may be housed in the ear hook 102. The mechanical and electrical configurations are symmetric between the right and left earbuds. A user can power up to start the operation by pushing the power button 225 in each earbud. The user can then touch the touch sensor button 200 coupled to the touch sensor 201 in one of the earbuds. Upon sensing the touch, the touch sensor 201 activates the controller 205 of the touched earbud to perform various functions as a master with the other earbud of the pair as a slave, whereby a master-slave configuration may be formed. The electronic circuitry on the PCB 204 may include the controller 205 including firmware for controlling various electronic components including modules in the earbud. The controller 205 in the electronic circuitry on the PCB 204 of the touched earbud, i.e., the master earbud, controls the transceiver 322 to activate the antenna 312 to wirelessly communicate with an external device such as a smartphone, MP3 player, iPod, a radio and other mobile devices, based on the Bluetooth standard, for example. The audio signal received from the external device by the antenna 312 coupled with the transceiver 322 is then sent to the driver 208, which generates corresponding vibrations, i.e., sound, for the user to listen to.

Additionally, the controller 205 controls the transceiver 322 to activate the antenna 312 of the master earbud to wirelessly communicate with the same and symmetrically configured antenna 312 of the other earbud, i.e., the slave earbud, by sending a trigger signal. Upon receiving the trigger signal, in the slave earbud, the controller 205 is triggered to control the transceiver 322 in the slave earbud to activate the antenna 312 in the slave earbud to wirelessly communicate with the same external device to receive the audio signals. The audio signal is then sent to the driver 208 of the slave earbud. Thus, both the earbuds receive the audio signals from the same external audio source, providing the user with a high-quality audio experience with the stereo effect.

An alternative signal transmission path, which corresponds to the alternative signal transmission path for the two-antenna case indicated by dashed lines in FIG. 5, is also possible for the one-antenna case in FIG. 6. As in the previous scenario, a user can power up to start the operation by pushing the power button 225 in each earbud. The user can then touch the touch sensor button 200 coupled to the touch sensor 201 in one of the earbuds. Upon sensing the touch, the touch sensor 201 activates the controller 205 of the touched earbud to perform various functions as a master with the other earbud of the pair as a slave, whereby a master-slave configuration is formed. The controller 205 of the touched earbud, i.e., the master earbud, then controls the transceiver 322 to activate the antenna 312 to wirelessly communicate with an external device such as a smartphone, MP3 player, iPod, a radio and other mobile devices, based on the Bluetooth standard, for example. The audio signal from the external device received by the antenna 312 coupled with the transceiver 322 is then sent to the driver 208, which generates corresponding vibrations, i.e., sound, for the user to listen to. Additionally, the audio signal received from the external device by the antenna 312 coupled with the transceiver 322 in the master earbud can be transmitted out from the antenna 312 of the master earbud to the same and symmetrically configured antenna 312 of the slave earbud. The audio signal received from the master earbud by the antenna 312 of the slave earbud is then sent to the driver 208 by the transceiver 322 of the slave earbud. Thus, both the earbuds receive the audio signals from the same external audio source, providing the user with a high-quality audio experience with the stereo effect.

As shown in FIG. 6, the user's voice can be detected by the microphone 230, which may be coupled to the PCB 204. The controller 205 controls the transceiver 322 to process the voice signal and control the antenna 312 to transmit out the voice signal to an external device, such as a smartphone, based on the Bluetooth standard, for example. The antenna 312 coupled with the transceiver 322 in the master earbud may be used to send the voice signal to a smartphone, for example, enabling the user to have a phone conversation through the microphone 230 in the master earbud, without having to hold the smartphone in the proximity of his/her mouth.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A wireless pair of earbuds, each earbud comprising:
an earbud body including a tip configured to be inserted in an ear canal of a user, the earbud body housing electronic circuitry including a controller for controlling components in the earbud; and
an ear hook coupled with the earbud body and configured to fit around a root of an ear pinna of the user, the ear hook housing an antenna and comprising a first branch and a second branch, the first branch being configured to be adjusted to fit around the root of the ear pinna, and the second branch being configured to house at least a distal end portion of the antenna, wherein
the second branch is configured to be adjusted to position away from a lower head of the user above a neck and to protrude from a back of the ear.

2. The wireless pair of earbuds of claim 1, wherein the antenna comprises a conductive wire formed to bend along and within the ear hook.

3. The wireless pair of earbuds of claim 1, wherein the first and second branches are configured to meet to connect to each other at an end, forming a loop made of the connected two branches.

4. The wireless pair of earbuds of claim 1, wherein the antenna is coupled to a transceiver associated with the controller, wherein the antenna and the transceiver are configured to wirelessly communicate with an external device.

5. The wireless pair of earbuds of claim 4, wherein the antenna and the transceiver in one earbud are further configured to wirelessly communicate with the antenna and the transceiver in the other earbud of the pair.

6. The wireless pair of earbuds of claim 4, wherein the wireless communication with the external device is based on the Bluetooth standard.

7. The wireless pair of earbuds of claim 5, wherein the wireless communication between the earbuds of the pair is based on the Bluetooth standard.

8. The wireless pair of earbuds of claim 1, wherein the earbud body houses a touch sensor for sensing a touch by a user, wherein the touched earbud becomes a master, and the other earbud of the pair becomes a slave, whereby a master-slave configuration is formed.

9. The wireless pair of earbuds of claim 8, wherein the controller of the master controls the transceiver to activate the antenna of the master to wirelessly communicate with an external device to receive audio signals from the external device, and to wirelessly communicate with the antenna of the slave by sending a trigger signal, and
wherein upon receiving the trigger signal the controller of the slave controls the transceiver of the slave to activate the antenna of the slave to wirelessly communicate with the external device to receive audio signals from the extremal device.

10. The wireless pair of earbuds of claim 8, wherein the controller of the master controls the transceiver to activate the antenna of the master to wirelessly communicate with an external device to receive audio signals from the external device, and to wirelessly communicate with the antenna of the slave by transmitting out the audio signals to the antenna of the slave.

11. The wireless pair of earbuds of claim 1, wherein the earbud body houses a microphone for detecting voice signals of the user,
wherein the antenna is coupled to a transceiver associated with the controller, the antenna and the transceiver being configured to transmit out the voice signals to an external device.

12. The wireless pair of earbuds of claim 1, wherein the earbud body houses a driver for generating sound for the user to listen to, the sound corresponding to audio signals received by the antenna from an external device.

13. The wireless pair of earbuds of claim 1, wherein the earbud body houses mechanical parts and second electronic circuitry for enabling at least one of a hard ON/OFF operation, a play or pause mode selection, a track forward or backward selection, and a volume up and down operation.

14. The wireless pair of earbuds of claim 1, wherein a first antenna is housed in the earbud body and coupled to a first transceiver associated with the controller, the first antenna and the first transceiver being configured to wirelessly communicate with an external device, and
the antenna housed in the ear hook is a second antenna coupled to a second transceiver associated with the controller, wherein the second antenna and the second transceiver in one earbud are configured to wirelessly communicate with the second antenna and the second transceiver in the other earbud of the pair.

15. The wireless pair of earbuds of claim 14, wherein the earbud body houses a touch sensor for sensing a touch by a user, wherein the touched earbud becomes a master, and the other earbud of the pair becomes a slave, whereby a master-slave configuration is formed,
wherein the controller of the master controls the first transceiver to activate the first antenna of the master to wirelessly communicate with the external device to receive audio signals from the external device, and the second transceiver to activate the second antenna of the master to wirelessly communicate with the second antenna of the slave by sending a trigger signal, and
wherein upon receiving the trigger signal the controller of the slave controls the first transceiver of the slave to activate the first antenna of the slave to wirelessly communicate with the external device to receive audio signals from the external device.

16. The wireless pair of earbuds of claim 15, wherein the earbud body houses a touch sensor for sensing a touch by a user, wherein the touched earbud becomes a master, and the other earbud of the pair becomes a slave, whereby a master-slave configuration is formed, wherein the controller of the master controls the first transceiver to activate the first antenna of the master to wirelessly communicate with an external device to receive audio signals from the external device, and the second transceiver to activate the second antenna to wirelessly communicate with the second antenna of the slave by transmitting out the audio signals to the second antenna of the slave.

17. The wireless pair of earbuds of claim 1, wherein the first and second branches are separate at ends.

18. The wireless pair of earbuds of claim 1, wherein the first and second branches are contiguously attached to each other, forming a wide plate-like or a fin-like shape at a distal end portion of the ear hook.

* * * * *